United States Patent
Huang et al.

(10) Patent No.: US 11,566,619 B2
(45) Date of Patent: Jan. 31, 2023

(54) ROTARY CYLINDER PISTON COMPRESSOR PUMP AND COMPRESSOR WITH ROTARY CYLINDER PISTON COMPRESSOR PUMP

(71) Applicant: Gree Green Refrigeration Technology Center Co., Ltd. of Zhuhai, Guangdong (CN)

(72) Inventors: Hui Huang, Guangdong (CN); Yusheng Hu, Guangdong (CN); Liying Deng, Guangdong (CN); Zhongcheng Du, Guangdong (CN); Jia Xu, Guangdong (CN)

(73) Assignee: Gree Green Refrigeration Technology Center Co., Ltd. of Zhuhai, Zhuhai (CN)

( * ) Notice: Subject to any disclaimer, the term of this patent is extended or adjusted under 35 U.S.C. 154(b) by 73 days.

(21) Appl. No.: 17/390,669

(22) Filed: Jul. 30, 2021

(65) Prior Publication Data
US 2021/0355943 A1 Nov. 18, 2021

Related U.S. Application Data

(63) Continuation-in-part of application No. 16/314,584, filed as application No. PCT/CN2017/073923 on Feb. 17, 2017, now abandoned.

(30) Foreign Application Priority Data

Jul. 29, 2016 (CN) .......................... 201610614674.X

(51) Int. Cl.
*F04C 15/00* (2006.01)
*F04C 29/02* (2006.01)
(Continued)

(52) U.S. Cl.
CPC .......... *F04C 15/0088* (2013.01); *F04C 29/02* (2013.01); *F04C 29/023* (2013.01);
(Continued)

(58) Field of Classification Search
CPC ...... F04C 29/023; F04C 18/00; F04C 18/344; F04C 2210/14; F04C 2210/22;
(Continued)

(56) References Cited

U.S. PATENT DOCUMENTS 4,091,638 A * 5/1978 Mitch ................... F25B 31/026
62/470
4,704,076 A * 11/1987 Kawaguchi ........... F04C 29/023
418/94
4,723,895 A 2/1988 Hayase

FOREIGN PATENT DOCUMENTS

CN 201412333 Y 2/2010
CN 101749246 A 6/2010
(Continued)

OTHER PUBLICATIONS

CN204877940 translation (Year: 2020).*
(Continued)

*Primary Examiner* — Kenneth J Hansen
*Assistant Examiner* — David N Brandt
(74) *Attorney, Agent, or Firm* — McAndrews, Held & Malloy, Ltd.

(57) ABSTRACT

A rotary cylinder piston compressor pump is provided, including a rotating shaft (2), a piston (3) and a cylinder (4). A rotating shaft hole (21) is provided in the rotating shaft (2). An oil guiding channel, provided in the cylinder (4), communicating with the rotating shaft hole (21). A recess (45) is formed in the inner end face of the cylinder (4). An oil path (61) sealed relative to a compression cavity (49) of the cylinder (4) is formed between the recess (45) and the piston
(Continued)

(3). The oil path (61) between the recess (45) and the piston (3) is communicated with an oil path (62) between the piston (3) and the rotating shaft (2) and is communicated with the oil guiding channel by means of an oil returning channel. Also provided is a compressor including the compressor pump.

11 Claims, 13 Drawing Sheets

(51) Int. Cl.
    *F16N 13/20*     (2006.01)
    *F25B 1/04*     (2006.01)

(52) U.S. Cl.
    CPC .... *F04C 2240/60* (2013.01); *F04C 2240/603* (2013.01); *F16N 13/20* (2013.01); *F25B 1/04* (2013.01); *F25B 2500/16* (2013.01)

(58) Field of Classification Search
    CPC ............ F04C 2240/60; F04C 2240/603; F04C 15/0088; F04C 29/02; F16N 13/20; F25B 1/04; F25B 2500/16
    See application file for complete search history.

(56) References Cited

FOREIGN PATENT DOCUMENTS

| | | | |
|---|---|---|---|
| CN | 202851360 U | 4/2013 | |
| CN | 104373349 A | 2/2015 | |
| CN | 105114322 A | 12/2015 | |
| CN | 204877940 | * 12/2015 | .............. F01C 1/344 |
| CN | 204877940 U | 12/2015 | |
| CN | 105545736 A | 5/2016 | |
| CN | 106015008 A | 10/2016 | |
| CN | 106015009 A | 10/2016 | |
| CN | 206206177 U | 5/2017 | |
| JP | H11230069 A | 8/1999 | |
| WO | 2016067355 A1 | 5/2017 | |

OTHER PUBLICATIONS

International Search Report corresponding to International Patent Application No. PCT/CN2017/073923, dated May 31, 2017 (3 pages).

JP application first examination report dated Jan. 7, 2020 (3 pages).

* cited by examiner

ROTARY CYLINDER PISTON COMPRESSOR PUMP AND COMPRESSOR WITH ROTARY CYLINDER PISTON COMPRESSOR PUMP

The present application is a continuation-in-part application of U.S. application Ser. No. 16/314,584, filed on Dec. 31, 2018, entitled "Rotary Cylinder Piston Compressor Pump and Compressor with Rotary Cylinder Piston Compressor Pump," which is a 371 application of International Patent Application No. PCT/CN2017/073923, filed Feb. 17, 2017, entitled "Rotary Cylinder Piston Compressor Pump And Compressor Using Same" which claims priority to Chinese Patent Application No. 201610614674.X, filed Jul. 29, 2016, all of which are incorporated herein by reference in their entireties.

TECHNICAL FIELD

The present disclosure relates to a technical field of compressors, and more particularly to a rotary cylinder piston compressor pump and a compressor with the rotary cylinder piston compressor pump.

BACKGROUND

A rotary cylinder piston compressor belongs to a refrigeration piston compressor of a brand new structure, which essentially adopts a cross slider structure principle. Referring to FIG. 10, O1 is the center of a rotating shaft, O2 is the center of a cylinder, e is a center-to-center distance (i.e., eccentric amount of the compressor), and a square is the center of mass of a piston. When the rotating shaft rotates, the piston is driven to move in a circular motion, and the distance between the piston and the center of the cylinder is in the range of 0 to e. The rotating shaft is eccentrically assembled with the cylinder, and the rotating shaft drives the cylinder to rotate through the piston. Due to the eccentric relationship between the rotating shaft and the cylinder, the rotating shaft and the cylinder rotate around the respective axes during operation, and the piston reciprocates relative to the cylinder to achieve gas compression.

Specifically, the rotating shaft of the rotary cylinder piston compressor is eccentrically assembled with the cylinder, the rotating shaft drives the cylinder to rotate through the piston, and oil is pumped through a short shaft hole in a cylinder short shaft to a rotating shaft hole in the rotating shaft of the cylinder. Due to the eccentric relationship between the rotating shaft and the cylinder, the rotating shaft and the cylinder rotate around the respective axes during operation. On the one hand, the contact between the lower end surface of the rotating shaft and the end surface of the cylinder ensures the oil supply of the rotating shaft, but brings adverse influence on the circulation of an oil groove oil channel on the side surface of the rotating shaft, which is not conducive to the lubrication the kinematic pair of the rotating shaft and the piston under heavy working conditions. On the other hand, an intersection area of the inner hole of the rotating shaft and the cylinder hole of the cylinder has a great influence on the oil supply of the rotating shaft.

In view of the above problems, there is a need for a rotary cylinder piston compressor pump and a compressor with the rotary cylinder piston compressor pump, which can solve the problem in the conventional art of large circulation resistance of an oil groove oil channel on the side surface of a rotating shaft.

SUMMARY

An objective of the present disclosure is to provide a rotary cylinder piston compressor pump, which can solve the problem in the conventional art of large circulation resistance of an oil groove oil channel on the side surface of a rotating shaft.

Another objective of the present disclosure is to provide a compressor adopting the rotary cylinder piston compressor pump as described above.

In order to achieve the objectives, the present disclosure adopts the following technical solutions.

A rotary cylinder piston compressor pump includes a rotating shaft, a piston and a cylinder, wherein a rotating shaft hole is provided in the rotating shaft, an oil guiding channel, provided in the cylinder, communicating with the rotating shaft hole, a recess is formed in the inner end face of the cylinder, an oil path sealed relative to a compression cavity of the cylinder is formed between the recess and the piston, and the oil path between the recess and the piston is communicated with an oil path between the piston and the rotating shaft and is communicated with the oil guiding channel by means of an oil returning channel, the oil returning channel includes a cylinder oil hole provided on the cylinder, and the cylinder oil hole penetrates through the bottom of the recess and the outer surface of the cylinder.

As a preferred solution of the above rotary cylinder piston compressor pump, the oil returning channel further includes a cylinder short shaft hole provided on a cylinder short shaft, the cylinder short shaft hole is communicated with the cylinder oil hole, and the cylinder short shaft hole penetrates through the inner surface and the outer surface of the cylinder short shaft.

As a preferred solution of the above rotary cylinder piston compressor pump, the rotating shaft hole has a first cross-sectional area and the oil guiding channel has a second cross-sectional area; whereas the first cross-sectional area and the second cross-sectional area axially overlap creating a third cross-sectional area; and the third cross-sectional area is not less than 20% of the first cross-sectional area.

As a preferred solution of the above rotary cylinder piston compressor pump, the cylinder includes a cylinder short shaft, and the oil guiding channel is a cylinder hole provided in the cylinder short shaft.

As a preferred solution of the above rotary cylinder piston compressor pump, the oil guiding channel is an oil guiding pipe;

the cylinder includes a cylinder short shaft, the cylinder short shaft is provided with a through hole structure for providing a moving space for movement of the oil guiding pipe, and the oil guiding pipe is disposed in the through hole structure; and one end of the oil guiding pipe is mounted on the rotating shaft, the outlet end of the oil guiding pipe is butted with the rotating shaft hole, and an oil guiding sheet is disposed in the oil guiding pipe.

As a preferred solution of the above rotary cylinder piston compressor pump, a rotating shaft hole oil guiding sheet is disposed in the rotating shaft hole.

As a preferred solution of the above rotary cylinder piston compressor pump, a piston oil hole penetrating through the inner surface and the outer surface of the piston is provided on the side wall of the piston.

As a preferred solution of the above rotary cylinder piston compressor pump, the inlet end of the rotating shaft hole is a tapered structure flared outward.

A compressor may include a housing component, a motor component, the rotary cylinder piston compressor pump as described above, an upper cover component and a lower cover component.

The present disclosure has the beneficial effects as follows. By providing the recess and the oil returning channel, the oil discharging resistance of an oil hole in the side surface of the rotating shaft is effectively reduced, the oil discharging quantity of the oil hole of the rotating shaft is increased, and therefore, the problem of abnormal abrasion caused by insufficient lubrication between the side surface of the rotating shaft and the piston under a heavy working condition is effectively solved.

1: Upper flange; 2: rotating shaft; 3: piston; 4: cylinder; 5: cylinder sleeve; 6: lower flange; 7: oil guiding pipe; 8: oil guiding sheet;

21: rotating shaft hole; 211: inlet end; 22: rotating shaft hole oil guiding sheet;

31: piston oil hole;

41: piston hole; 42: cylinder short shaft; 43: cylinder hole; 44: cylinder hole oil guiding sheet; 45: recess; 46: cylinder oil hole; 47: cylinder short shaft hole; 48: through hole structure; 49: compression cavity;

51: inlet; 52: outlet;

61: oil path; 62: oil path;

71: housing component; 72: motor component; 73: upper cover component; 74: lower cover component.

DETAILED DESCRIPTION OF THE EMBODIMENTS

The technical solutions of the present disclosure will be further described below in conjunction with the accompanying drawings and specific implementations.

Figure 10:
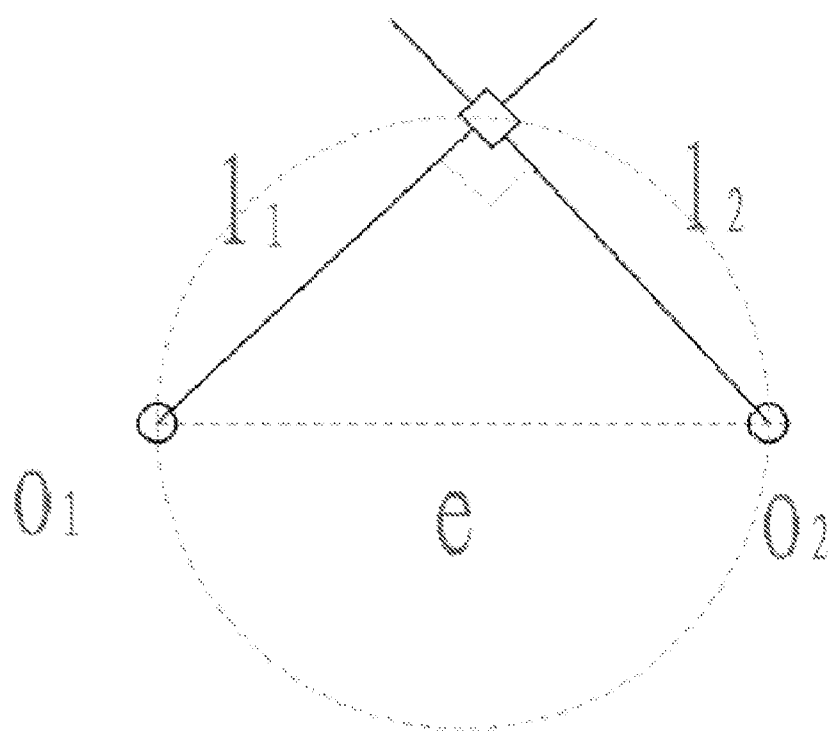
FIG. 10 is a schematic structure diagram of a cross slider.
Figure 11:
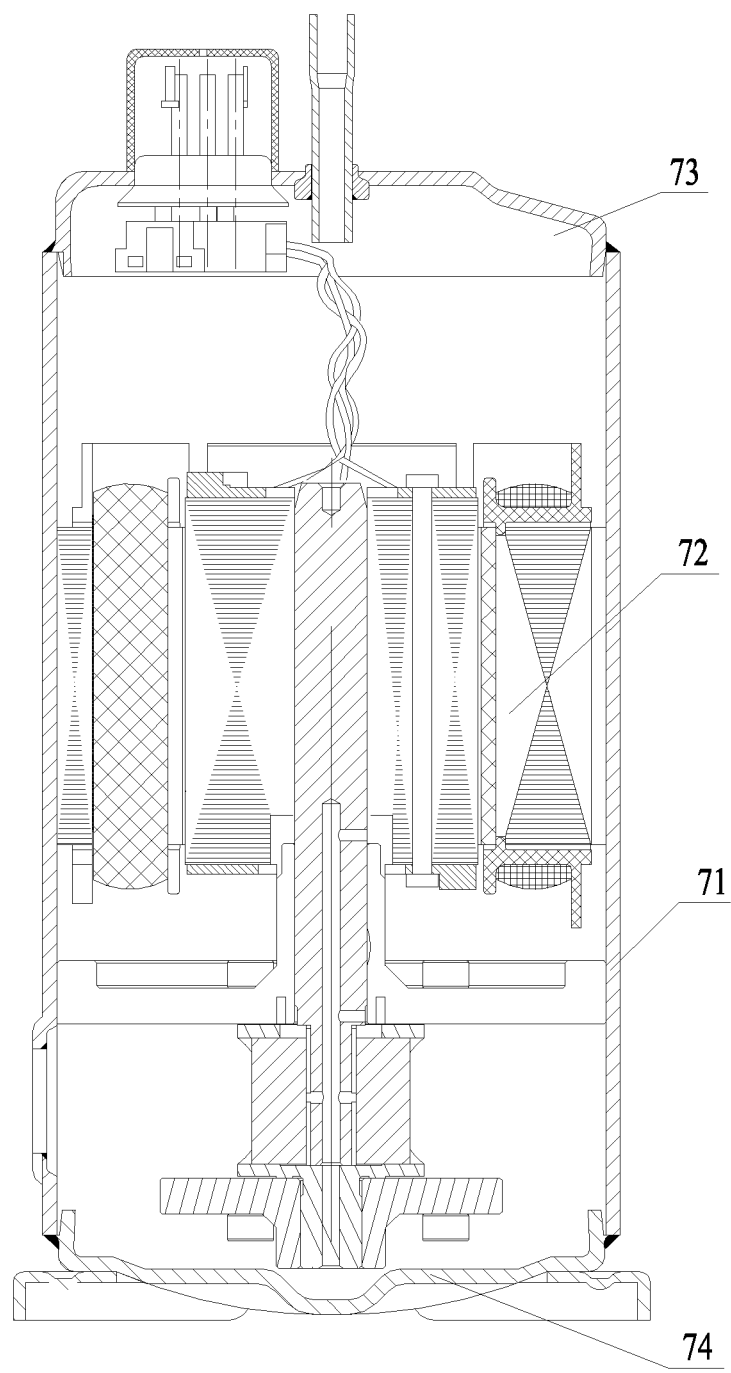
FIG. 11 is a schematic structure diagram of a compressor according to some embodiments of the present disclosure.

Some embodiments of the present disclosure provide a rotary cylinder piston compressor pump adopting a cross slider structure principle, the principle of which is as shown in FIG. 10. A shaft center O1 of a rotating shaft 2 and a shaft center O2 of a cylinder 4 are provided in an eccentric manner, the eccentric distance therebetween is fixed, and the rotating shaft and the cylinder sleeve rotate around the respective shaft centers. When the rotating shaft 2 rotates, a piston 3 slides linearly relative to the rotating shaft 2 and a cylinder 4, to achieve gas compression; and the cylinder 4 rotates in synchronism with the rotating shaft 2, and the piston 3 operates within a range of the eccentric distance e relative to the shaft center of the cylinder 4. The stroke of the piston 3 is 2e, and the cross-sectional area of the piston 3 is S; thus, the displacement volume (i.e. the maximum suction volume) of a compressor is $V=2*(2e*S)$. The piston 3 is equivalent to a slider in the cross slider structure, and slip fit surfaces of the piston 3—piston hole 41 and the piston 3—rotating shaft 2 respectively serve as two connecting rods 11 and 12 of the cross slider, thus forming a main structure of the cross slider principle.

As shown in FIG. 10, when the rotary cylinder piston compressor pump of the described structure operates, the rotating shaft 2 rotates around the shaft center O1 of the rotating shaft 2; the cylinder 4 rotates around the shaft center O2 of the cylinder 4, and the shaft center of the rotating shaft 2 and the shaft center of the cylinder 4 are provided in an eccentric manner and have a fixed eccentric distance; and the piston 3, under driving of the rotating shaft 2, rotates along with the rotating shaft 2, and simultaneously slides back and forth in the cylinder 4 along a direction perpendicular to the axis of the rotating shaft 2.

The rotary cylinder piston compressor pump operating in the described method constitutes the cross slider structure. The operating method adopts the cross slider structure principle, wherein the piston 3 serves as the slider, a slip fit surface of the rotating shaft 2 serves as the first connecting rod 11, and a piston hole 41 of the cylinder 4 serves as the second connecting rod 12 (please refer to FIG. 10).

Specifically, the shaft center O1 of the rotating shaft 2 is equivalent to the center of rotation of the first connecting rod 11, and the shaft center O2 of the cylinder 4 is equivalent to the center of rotation of the second connecting rod 12; the slip fit surface of the rotating shaft 2 is equivalent to the first connecting rod 11, and the piston hole 41 of the cylinder 4 is equivalent to the second connecting rod 12; and the piston 3 is equivalent to the slider. The piston hole 41 is perpendicular to the slip fit surface; and the piston 3 can only reciprocate relative to the piston hole 41, and the piston 3 can only reciprocate relative to the slip fit surface. Once the piston 3 is simplified as a center of mass, it can be found that the motion trajectory of the piston 3 is a circle, and the circle is a circle taking, as a diameter, a connecting line between the shaft center O2 of the cylinder 4 and the shaft center O1 of the rotating shaft 2.

When the second connecting rod 12 makes a circular motion, the slider can reciprocate along the second connecting rod 12; meanwhile, the slider can reciprocate along the first connecting rod 11. The first connecting rod 11 is perpendicular to the second connecting rod 12 all the time, so that the direction in which the slider reciprocates along the first connecting rod 11 is perpendicular to the direction in which the slider reciprocates along the second connecting rod 12. Relative motion relationships between the first connecting rod 11, the second connecting rod 12 and the piston 3 form the cross slider structure principle.

Figure 12:
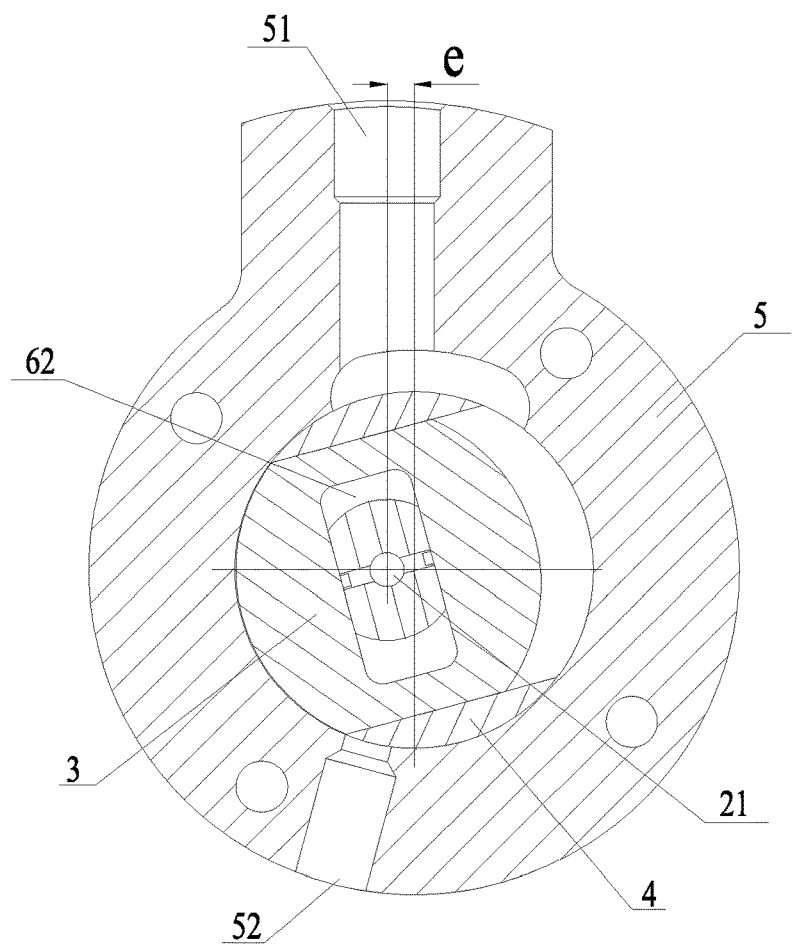
FIG. 12 is a schematic structure diagram of a cross section of the rotary cylinder piston compressor pump according to some embodiments of the present disclosure.
Figure 13:
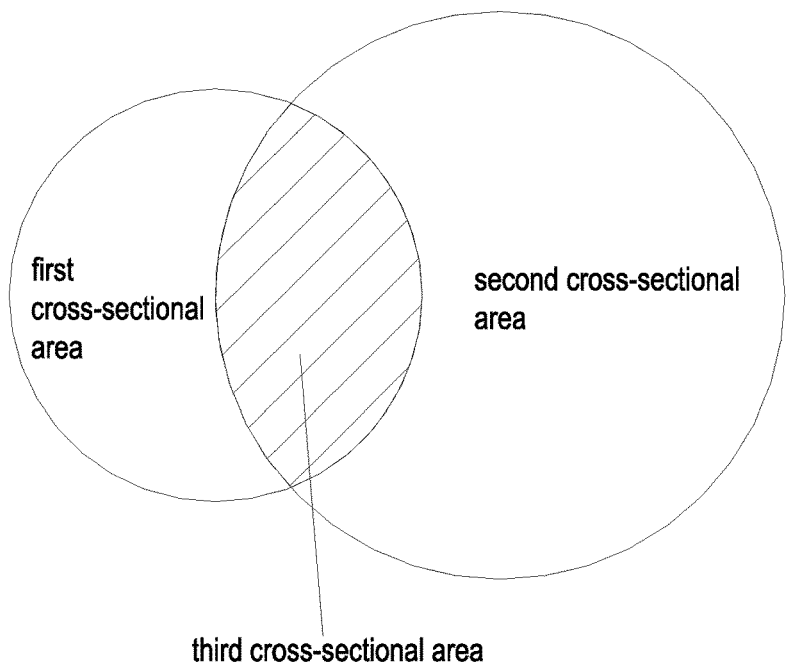
FIG. 13 is a schematic structure diagram of a first cross-sectional area, a second cross-sectional area and a second cross-sectional area of the rotary cylinder piston compressor pump according to some embodiments of the present disclosure.

In this motion method, the slider performs a circular motion, and the angular speed of the slider is equal to the rotation speed of the first connecting rod 11 and the second connecting rod 12. The motion trajectory of the slider is a circle. The circle takes, as a diameter, a center distance between the center of rotation of the first connecting rod 11 and the center of rotation of the second connecting rod 12. As shown in FIG. 12, there is an eccentric distance e between a shaft center of the rotating shaft 2 and a shaft center of cylinder 4, and the trajectory line of the center of mass of the piston is circular.

As shown in FIG. 12, there is an eccentric distance e between the shaft center of the rotating shaft 2 and the shaft center of the cylinder 4, and a trajectory line of the center of mass of the piston is circular.

The cylinder 4 is eccentrically mounted to the rotating shaft 2, the rotating shaft 2 is connected with a motor component 72, and the motor component 72 directly drives the rotating shaft 2 to rotate, which belongs to a piston driving structure. The rotating shaft 2 rotates to drive the cylinder 4 and the piston 3 to rotate, the piston 3, the cylinder 4 and the rotating shaft 2 cooperate with other pump parts during the rotation, so as to complete a process of suction, compression and exhaust, and the period of one cycle is $2\pi$.

Specifically, the motor component 72 drives the rotating shaft 2 to rotate; the rotating shaft 2 drives the piston 3 to rotate, and the piston 3 drives the cylinder 4 to rotate; however, the piston 3 only reciprocates relative to the cylinder 4, the piston 3 also only reciprocates relative to the rotating shaft 2, and the reciprocating of the rotating shaft 2—piston 3 is perpendicular to the reciprocating of the cylinder 4—piston 3. During the reciprocating, the whole rotary cylinder piston compressor pump completes the process of suction, compression and exhaust. During the motion of the piston, the two perpendicular reciprocations of the piston 3—cylinder 4 and the piston 3—rotating shaft 2 make the trajectory line of the center of mass of the piston 3 circular, the diameter of the circle is equal to the eccentric amount e, and the shaft center of the piston 3 is at a midpoint of a connecting line between the center of the rotating shaft 2 and the center of the cylinder 4, and the rotation period of the shaft center is $\pi$.

Figure 14:
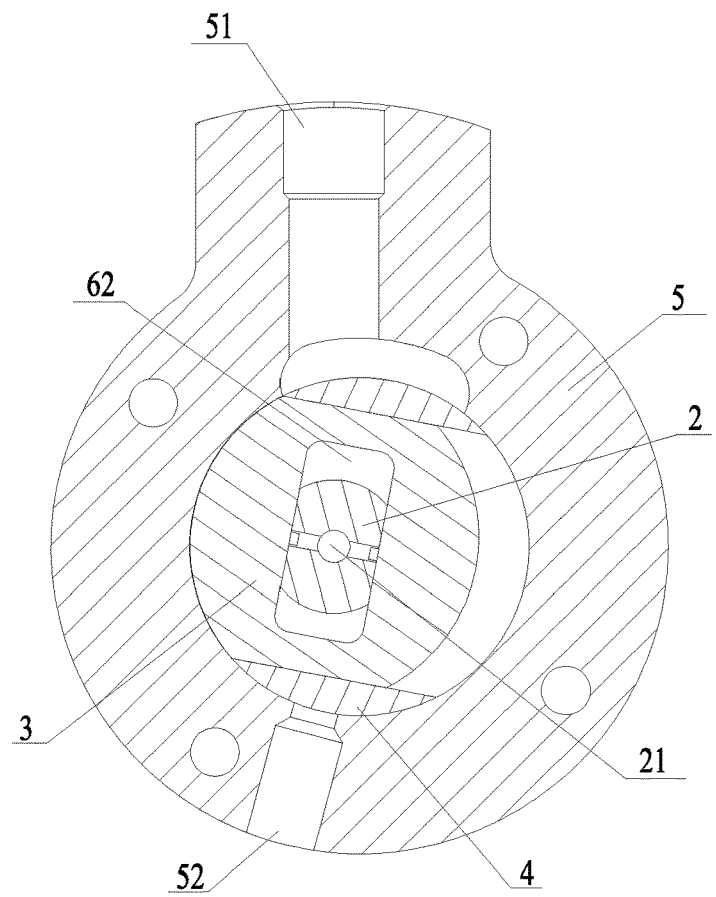
FIGS. 14 (a) to 14 (f) are schematic structure diagrams of working process of the rotary cylinder piston compressor pump according to some embodiments of the present disclosure.
Figure 14:
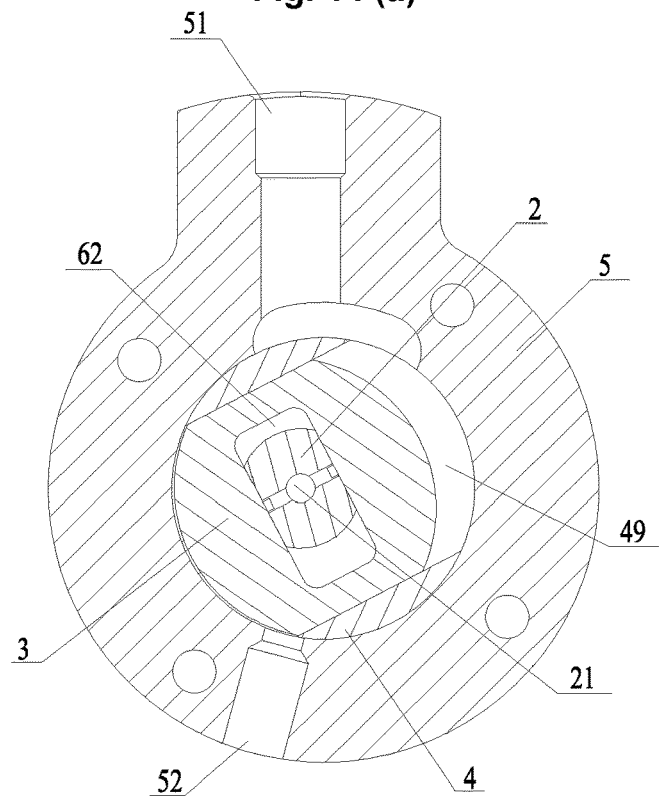
Figure 14:
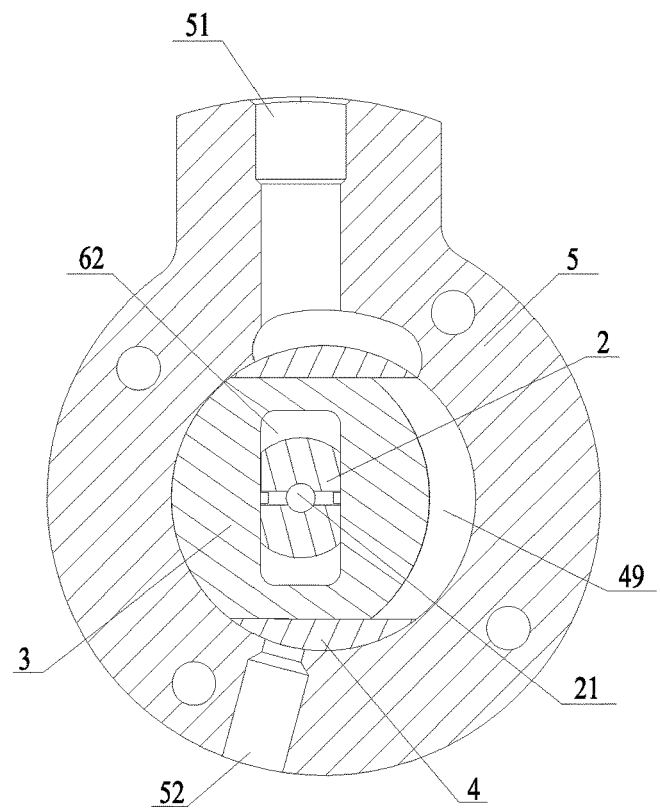
Figure 14:
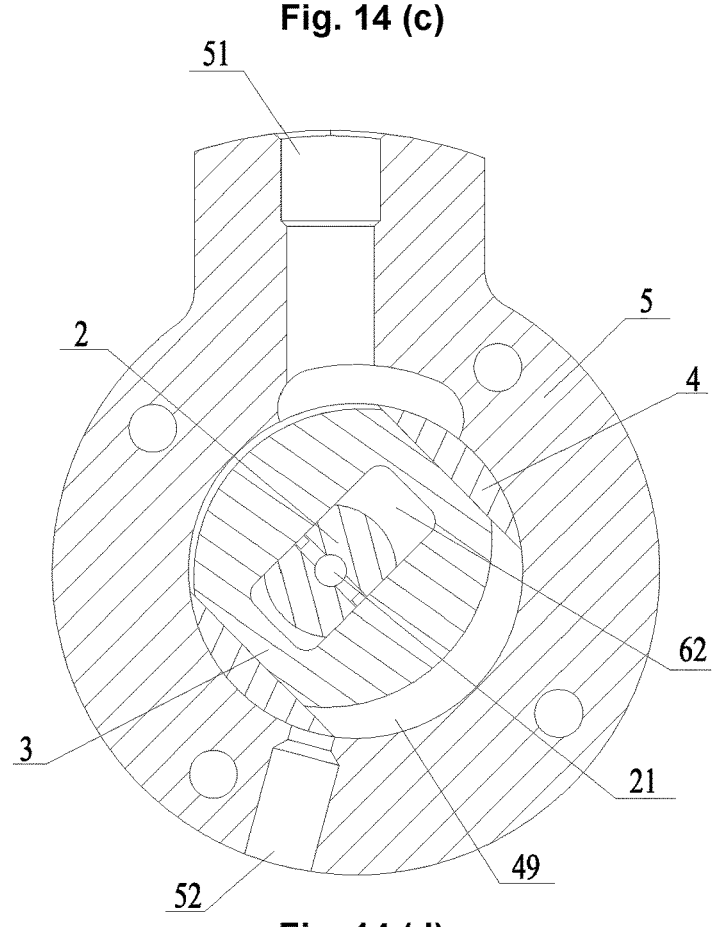
Figure 14:
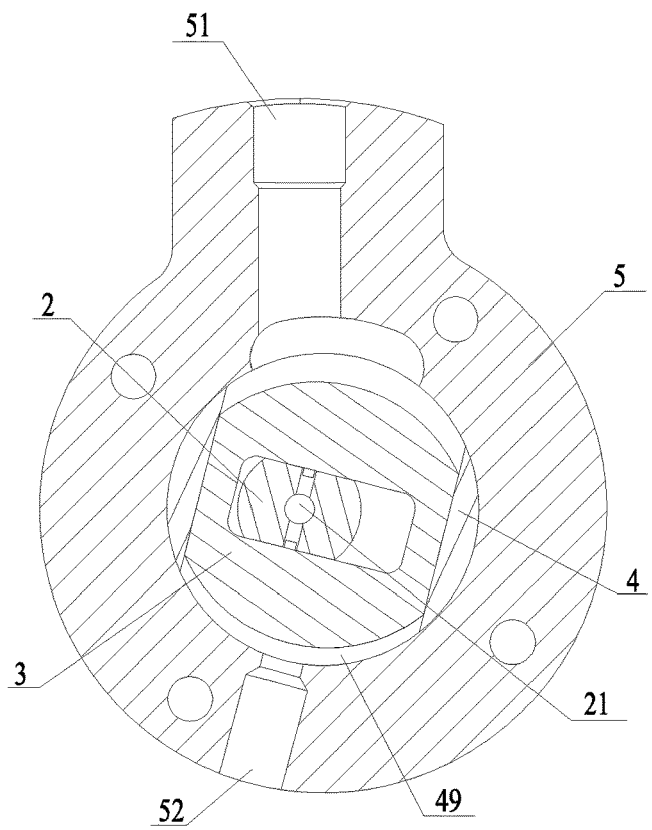
Figure 14:
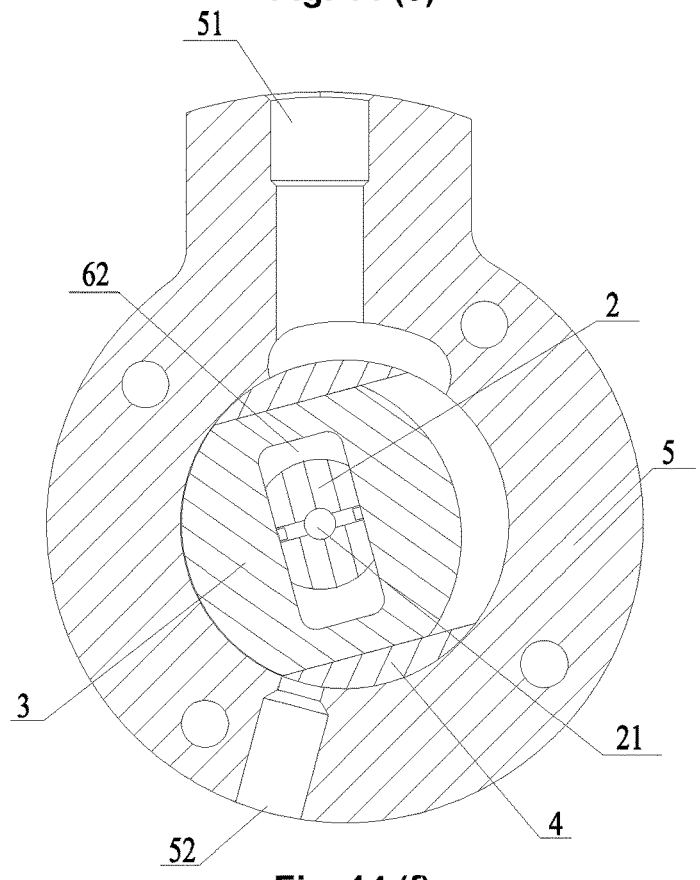
Figure 15:
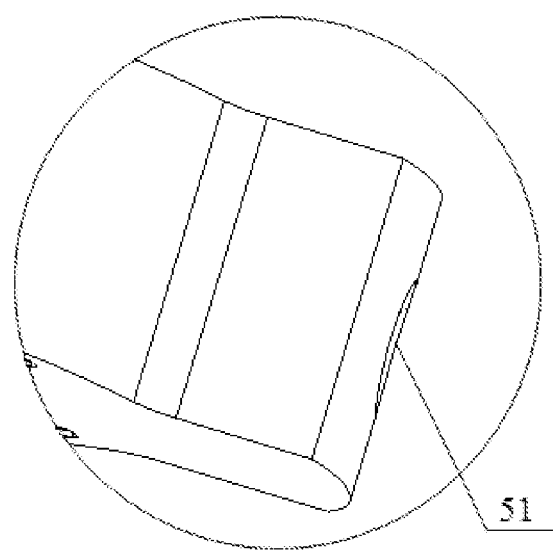
FIG. 15 is a partial enlarged view of "part II" in FIG. 1.

The piston 3 forms two cavities on a guide hole of the cylinder 4 and the inner circular surface of the cylinder sleeve 5, and when the cylinder 4 rotates once, the two cavities complete the process of suction, compression and exhaust respectively, and the difference lies in that there is a 180° phase difference between suction, exhaust and compression in the two cavities. Taking one of the cavities (namely compression cavity 49) as an example to illustrate the process of suction, exhaust and compression of the rotary cylinder piston compressor pump, the process is as follows: when the cavity is in communication with the inlet 51, the suction starts (please refer to FIGS. 14 (a) and 14 (b)); the rotating shaft 2 continues to drive a piston 3 and the cylinder 4 to rotate clockwise, and when a variable volume cavity is separated from the inlet 51, the whole suction process is finished, and at this time, the cavity is completely sealed, the compression starts (see FIG. 14 (c)); continuing to rotate, gas is continuously compressed, and when the variable volume cavity is in communication with the outlet 52, the exhaust starts (see FIG. 14 (d)); continuing to rotate, and continuously performing exhaust while continuously performing compression, until the variable volume cavity is completely separated from the outlet 52, so as to completing the whole process of suction, compression and exhaust (see FIGS. 14 (e) and 14 (f)); and subsequently, after the variable volume cavity is rotated by a certain angle, the variable volume cavity is connected to the inlet 51 again, for entering a next cycle.

First Embodiment

As shown in FIG. 1 to FIG. 5, the present embodiment provides a rotary cylinder piston compressor pump. The rotary cylinder piston compressor pump includes an upper flange 1, a rotating shaft 2, a piston 3, a cylinder 4, a cylinder sleeve 5, and a lower flange 6, wherein the piston 3 is mounted in a piston hole 41 of the cylinder 4, a cylinder short shaft 42 of the cylinder 4 is mounted on the lower flange 6, the cylinder sleeve 5 is mounted coaxially with the cylinder 4, the lower flange 6 is fixed at the lower end of the cylinder sleeve 5, a piston bearing surface of the rotating shaft 2 is fitted with a piston plane, the upper flange 1 fixes the upper half of the rotating shaft 2, and the upper flange 1 is fixed to the upper end of the cylinder sleeve 5 by screws.

Specifically, a rotating shaft hole 21 is provided in the rotating shaft 2, and an oil guiding channel communicated with the rotating shaft hole 21 is provided in the cylinder 4.

Figure 2:
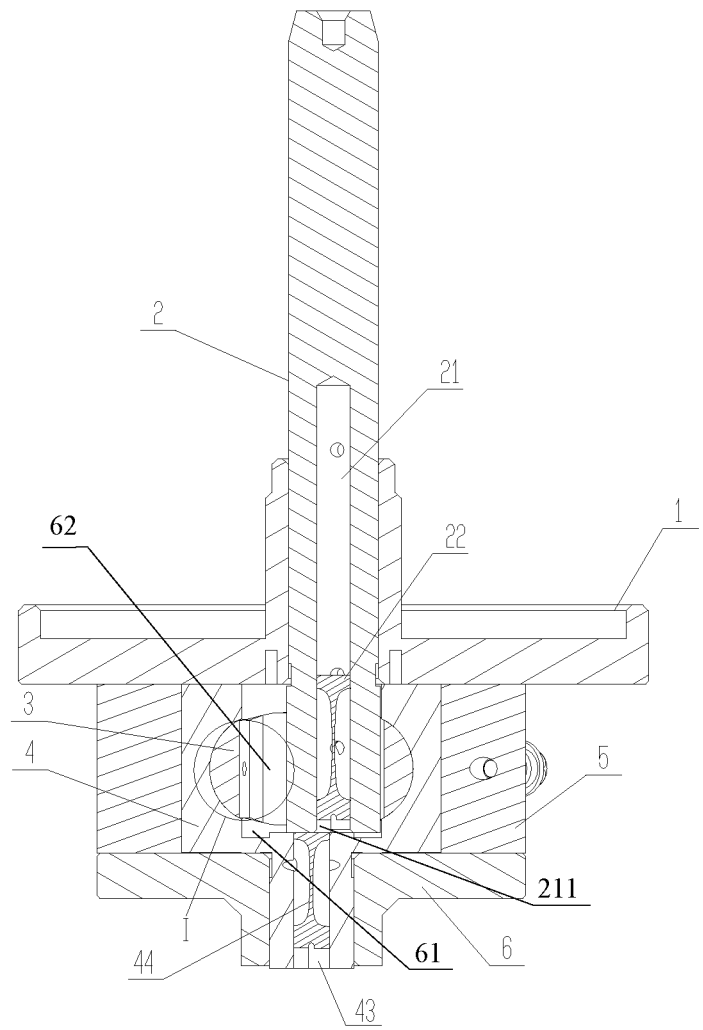
FIG. 2 is a schematic structure diagram of a rotary cylinder piston compressor pump according to a first embodiment of the present disclosure.
Figure 3:
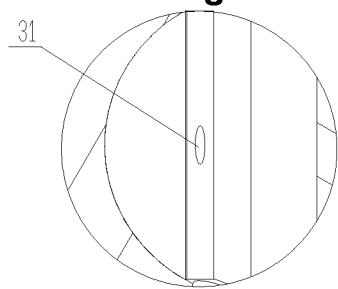
FIG. 3 is a partial enlarged view of "part I" in FIG. 2.
Figure 4:
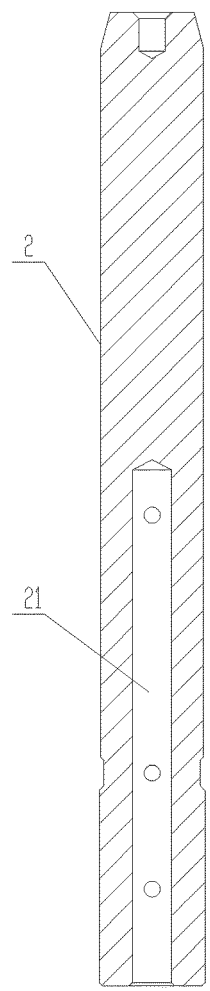
FIG. 4 is a schematic structure diagram of a rotating shaft according to a first embodiment of the present disclosure.
Figure 5:
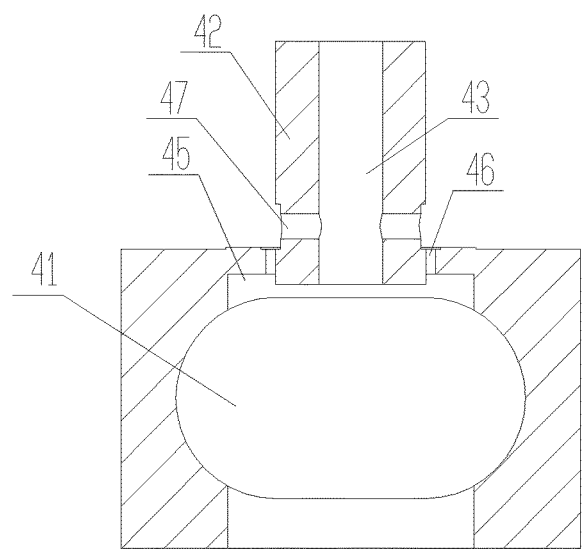
FIG. 5 is a schematic structure diagram of a cylinder according to a first embodiment of the present disclosure.

Referring to FIG. 2 and FIG. 5, a recess 45 is formed in the inner end face of the cylinder 4, an oil path 61 sealed relative to a compression cavity 49 of the cylinder 4 is formed between the recess 45 and the piston 3, the oil path 61 is communicated with an oil path 62 between the piston 3 and the rotating shaft 2 and is communicated with the oil guiding channel by means of an oil returning channel. Specifically, referring to FIG. 5, the recess 45 is an annular oil groove provided around the cylinder short shaft 42, and the provision of the recess 45 does not affect the air tightness between the cylinder short shaft 42 and the rotating shaft 2.

By providing the recess 45 and the oil returning channel, the oil discharging resistance of an oil hole in the side surface of the rotating shaft 2 is reduced, the oil discharging quantity of the oil hole of the rotating shaft 2 is increased, and therefore, the problem of abnormal abrasion caused by insufficient lubrication between the side surface of the rotating shaft 2 and the piston 3 under a heavy working condition is effectively solved.

The oil returning channel includes a cylinder oil hole 46 provided on the cylinder 4, and the cylinder oil hole 46 penetrates through the bottom of the recess 45 and the outer surface of the cylinder 4.

The oil returning channel further includes a cylinder short shaft hole 47 provided on the cylinder short shaft 42, the cylinder short shaft hole 47 is communicated with the cylinder oil hole 46, and the cylinder short shaft hole 47 penetrates through the inner surface and the outer surface of the cylinder short shaft 42.

By providing the recess 45, the cylinder oil hole 46 and the cylinder short shaft hole 47, the oil discharging resistance of the oil hole in the side surface of the rotating shaft 2 is further reduced, the oil discharging quantity of the oil hole of the rotating shaft 2 is increased, and therefore, the problem of abnormal abrasion caused by insufficient lubrication between the side surface of the rotating shaft 2 and the piston 3 under a heavy working condition is effectively solved.

An intersection area of the rotating shaft hole 21 and the oil guiding channel is not less than 20% of a cross-sectional area of the rotating shaft hole 21. By increasing the intersection area of the rotating shaft hole 21 and the oil guiding channel, the oil pumping amount of the rotating shaft 2 is able to be increased.

A specific means of increasing the intersection area of the rotating shaft hole 21 and the oil guiding channel is to increase the diameter of the rotating shaft hole 21 of the rotating shaft 2. Preferably, the ratio of the inner diameter of the rotating shaft hole 21 to the outer diameter of the rotating shaft 2 ranges from 0.3 to 0.6. Further preferably, the ratio of the inner diameter of the rotating shaft hole 21 to the outer diameter of the rotating shaft 2 is 0.35, 0.4 or 0.5. In the present embodiment, the inner diameter of the rotating shaft hole 21 is 6 mm, and the outer diameter of the rotating shaft 2 is 16.5 mm.

Referring to FIG. 2, in the present embodiment, the cylinder 4 includes a cylinder short shaft 42, and the oil guiding channel is a cylinder hole 43 provided in the cylinder short shaft 42. The cylinder hole 43 is provided with a cylinder hole oil guiding sheet 44. The cylinder hole oil guiding sheet 44 rotates in synchronism with the cylinder 4 and pumps oil into the rotating shaft hole 21 by a centrifugal force. Preferably, an intersection area of the rotating shaft hole 21 and the cylinder hole 43 is not less than one-third or one-fifth of the cross-sectional area of the rotating shaft hole 21.

Figure 1:
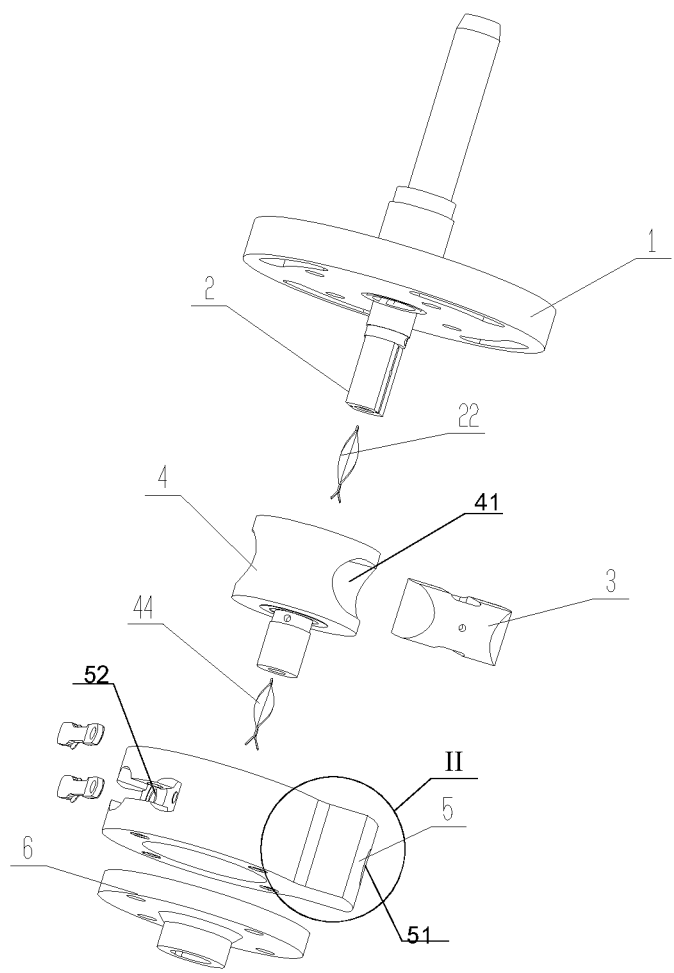
FIG. 1 is a schematic diagram illustrating an exploded state of a rotary cylinder piston compressor pump according to a first specific embodiment of the present disclosure.

Referring to FIG. 1 and FIG. 2, in order to further increase the oil pumping amount of the rotating shaft 2, a rotating shaft hole oil guiding sheet 22 is disposed in the rotating shaft hole 21. The rotating shaft hole oil guiding sheet 22 has the same structure as the conventional cylinder hole oil guiding sheet 44 disposed in the cylinder hole 43, and has a spiral blade type structure.

A piston oil hole 31 penetrating through the inner surface and the outer surface of the piston 3 is provided on the side wall of the piston 3. The piston oil hole 31 can lubricate the outer wall surface of the piston 3 and the inner wall surface of the cylinder 4 while reducing the oil loss caused by the reciprocating motion of the rotating shaft 2 in the piston hole.

The inlet end 211 of the rotating shaft hole 21 is a tapered structure flared outward. By arranging the end portion of the rotating shaft hole 21 into a tapered structure, an intersection area of the rotating shaft hole 21 and the oil guiding channel can be effectively increased under the premise of the same hole diameter of the rotating shaft hole 21.

In order to further explain the above rotary cylinder piston compressor pump, the present embodiment also provides the working process of the above pump:

A motor drives the rotating shaft 2 to rotate, and the piston supporting surface of the rotating shaft 2 drives the piston 3 to rotate, but the piston 3 only reciprocates relative to the rotating shaft 2; the non-circular (or circular) side of the piston further drives the cylinder 4 to rotate, at this time, the piston 3 only reciprocates relative to the cylinder 4, and the reciprocating direction of the piston 3 to the cylinder 4 is perpendicular to the reciprocating direction of the piston 3 to the rotating shaft 2; during the reciprocating motion, the entire pump structure completes the process of suction, compression and exhaust.

In this embodiment, a compressor is further provided, the compressor comprises a housing component 71, a motor component 72, the described rotary cylinder piston compressor pump, an upper cover component 73 and a lower cover component 74, wherein the upper cover component 73 is assembled on an upper end of the housing component 71, the lower cover component 74 is assembled on a lower end of the housing component 71, the motor component 72 and the rotary cylinder piston compressor pump are both located inside the housing component 71, and the motor component 72 is provided above the rotary cylinder piston compressor pump.

Second Embodiment

Figure 6:
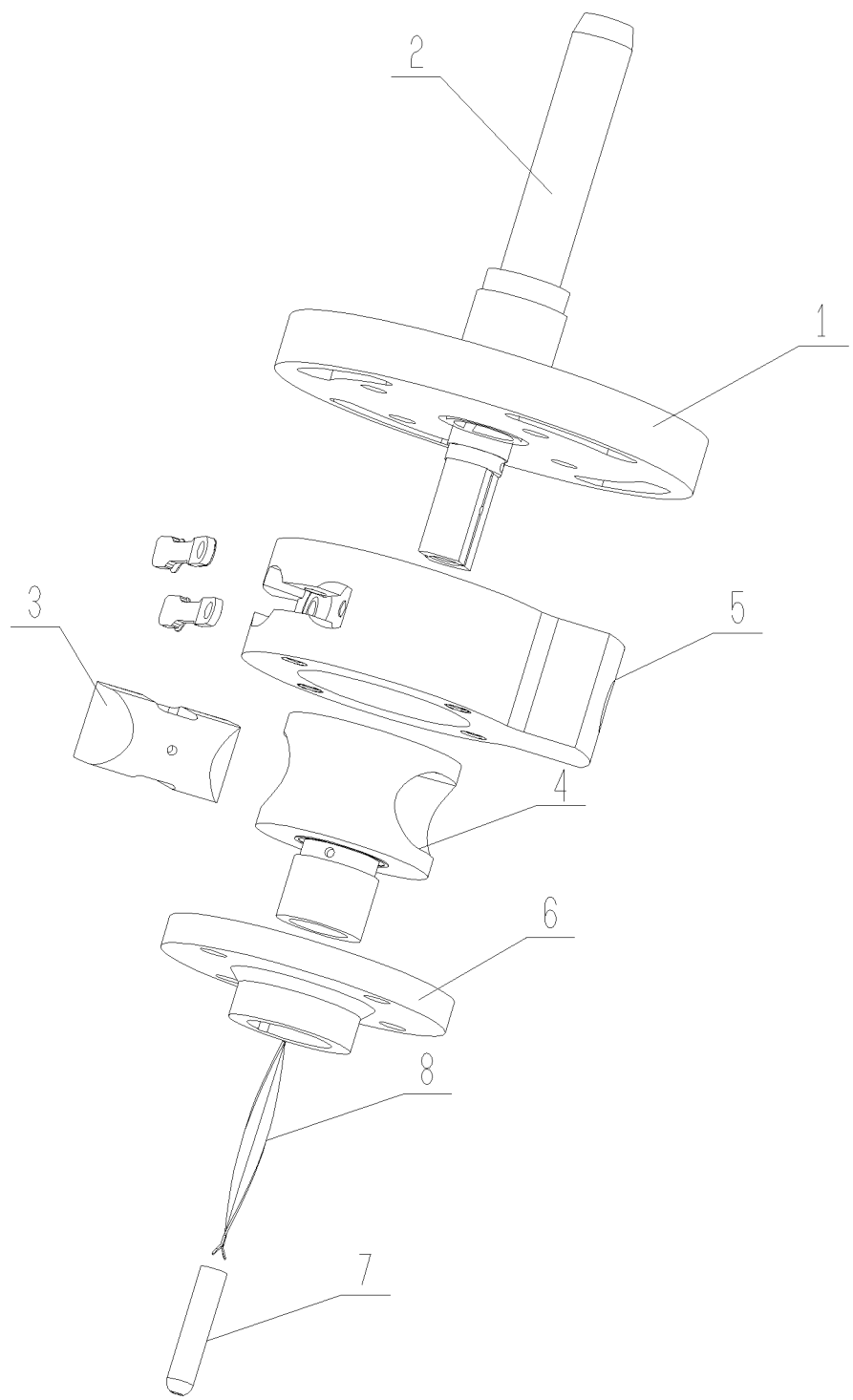
FIG. 6 is a schematic diagram illustrating an exploded state of a rotary cylinder piston compressor pump according to a second embodiment of the present disclosure.
Figure 7:
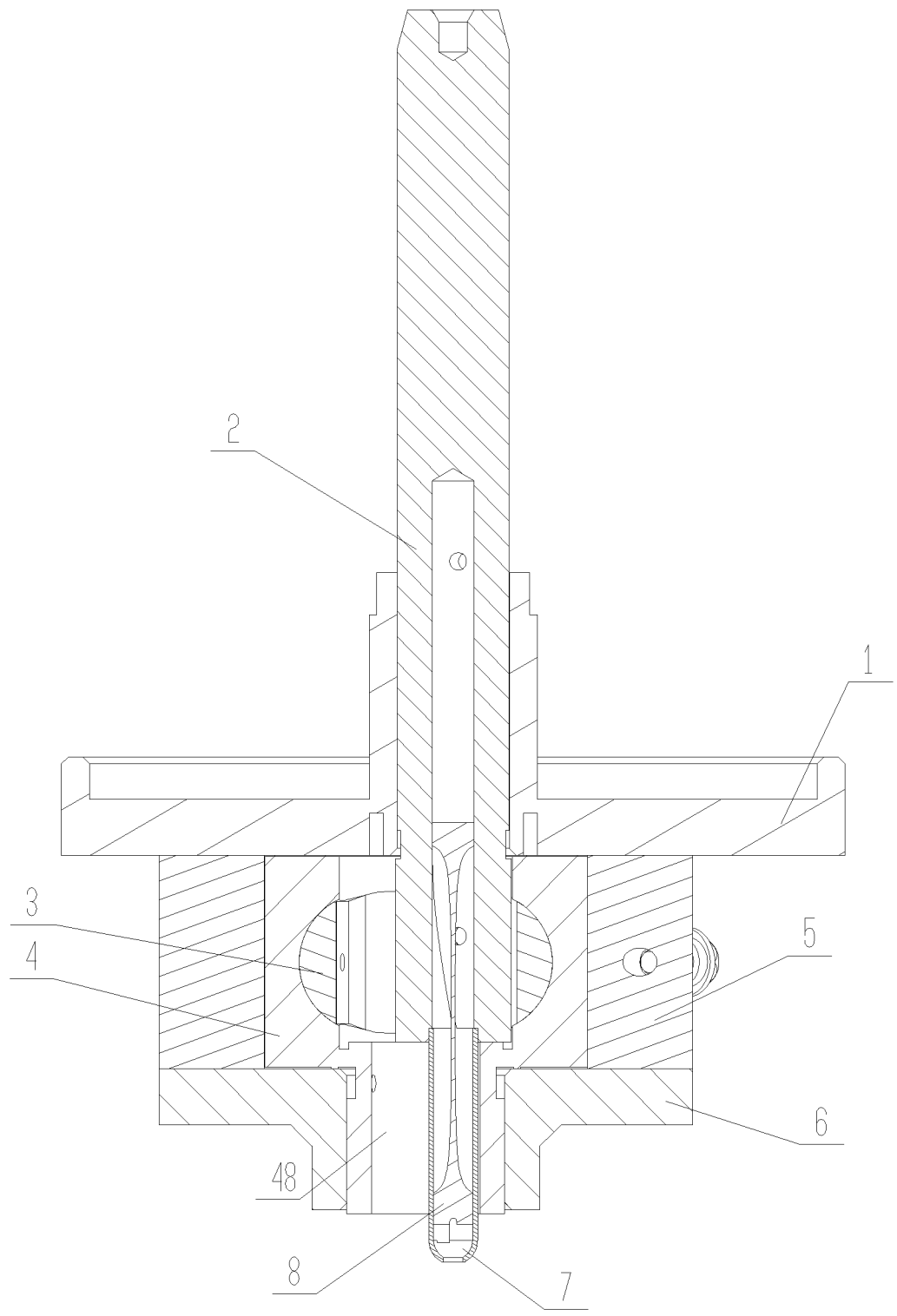
FIG. 7 is a schematic structure diagram of a rotary cylinder piston compressor pump according to a second embodiment of the present disclosure.

As shown in FIG. 6 to FIG. 9, in the present embodiment, another structural form of an oil guiding channel is provided. Referring to FIG. 6 and FIG. 7, the oil guiding channel is an oil guiding pipe 7. The cylinder 4 includes a cylinder short shaft 42, the cylinder short shaft 42 is provided with a through hole structure 48 for providing a moving space for movement of the oil guiding pipe 7, and the oil guiding pipe 7 is disposed in the through hole structure 48. One end of the oil guiding pipe 7 is mounted on the rotating shaft 2, the outlet end of the oil guiding pipe 7 is butted with the rotating shaft hole 21, and an oil guiding sheet 8 is disposed in the oil guiding pipe 7. The structure of the oil guiding sheet is the same as that of the rotating shaft oil guiding sheet 22 mentioned in the first embodiment.

In order to provide a moving space for the oil guiding pipe 7, the inner diameter of the cylinder short shaft 42 is larger than the inner diameter of the cylinder short shaft 42 in the first embodiment, and the corresponding inner diameter of a bearing on a lower flange 6 is also increased. Specifically, the ratio of the inner diameter of the through hole structure 48 to the outer diameter of the cylinder short shaft 42 ranges from 0.6 to 0.8. Preferably, the ratio of the inner diameter of the through hole structure 48 to the outer diameter of the cylinder short shaft 42 is 0.65, 0.7 or 0.75. In the present embodiment, the inner diameter of the through hole structure 48 is 14 mm, and the outer diameter of the cylinder short shaft 42 is 20 mm.

Figure 8:
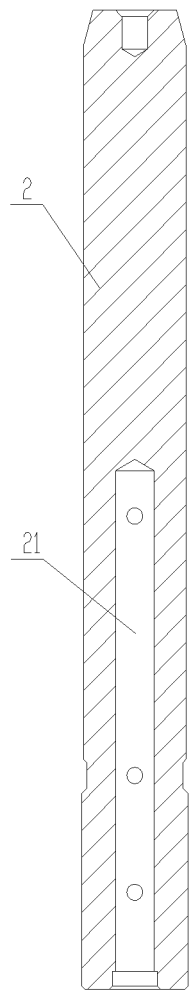
FIG. 8 is a schematic structure diagram of a rotating shaft according to a second embodiment of the present disclosure.
Figure 9:
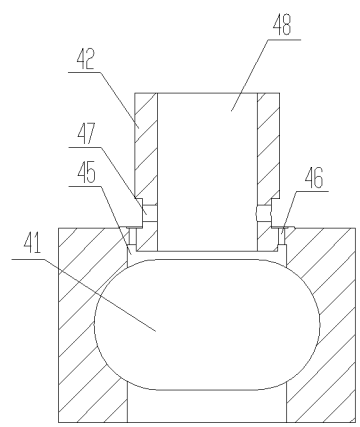
FIG. 9 is a schematic structure diagram of a cylinder according to a second embodiment of the present disclosure.

One end of the oil guiding pipe 7 is inserted into the rotating shaft hole 21, and the end portion of the rotating shaft hole 21 is arranged in a tapered structure. When the oil guiding pipe 7 is assembled into the rotating shaft hole 21, the tapered structure can play a guiding role, which is convenient for assembly of the oil guiding pipe 7. Referring to FIG. 8, the lower end of the rotating shaft hole 21 is a stepped hole for inserting the oil guiding pipe 7. By using the oil guiding pipe 7 as the oil guiding channel, the intersection area of the rotating shaft hole 21 and the oil guiding channel can be made the same as the cross-sectional area of the rotating shaft hole 21, whereby the oil pumping effect of the rotating shaft 2 can be remarkably improved.

It is to be noted that in this embodiment, other structures are the same as that of the first embodiment except that the structural form of the oil guiding channel is different from that of the first embodiment.

The technical principles of the present disclosure have been described above in connection with specific embodiments. The descriptions are only intended to explain the principles of the present disclosure and are not to be construed as limiting the scope of protection of the present disclosure. Based on the explanation herein, those skilled in the art can associate other specific implementations of the present disclosure without making creative works. These modes fall within the scope of protection of the present disclosure.

What is claimed is:

1. A rotary cylinder piston compressor pump, comprising a rotating shaft (2), a piston (3) and a cylinder (4), a rotating shaft hole (21) being provided in the rotating shaft (2), and an oil guiding channel, provided in the cylinder (4), communicating with the rotating shaft hole (21), wherein a recess (45) is formed in an inner end face of the cylinder (4), an oil path (61) sealed relative to a compression cavity (49) of the cylinder (4) is formed between the recess (45) and the piston (3), and the oil path (61) between the recess (45) and the piston (3) is communicated with an oil path (62) between the piston (3) and the rotating shaft (2) and is communicated with the oil guiding channel by means of an oil returning channel, the oil returning channel comprises a cylinder oil hole (46) provided on the cylinder (4), and the cylinder oil hole (46) penetrates through a bottom of the recess (45) and an outer surface of the cylinder (4).

2. The rotary cylinder piston compressor pump as claimed in claim 1, wherein the cylinder (4) comprises a cylinder short shaft (42), the oil returning channel further comprises a cylinder short shaft hole (47) provided on the cylinder short shaft (42), the cylinder short shaft hole (47) is communicated with the cylinder oil hole (46), and the cylinder short shaft hole (47) penetrates entirely through a wall of the cylinder short shaft (42).

3. The rotary cylinder piston compressor pump as claimed in claim 1, wherein the rotating shaft hole (21) has a first cross-sectional area and the oil guiding channel has a second cross-sectional area; whereas the first cross-sectional area and the second cross-sectional area axially overlap creating a third cross-sectional area; and the third cross-sectional area is not less than 20% of the first cross-sectional area.

4. The rotary cylinder piston compressor pump as claimed in claim 1, wherein the cylinder (4) comprises a cylinder short shaft (42), and the oil guiding channel is a cylinder hole (43) provided in the cylinder short shaft (42).

5. The rotary cylinder piston compressor pump as claimed in claim 1, wherein the oil guiding channel is an oil guiding pipe (7); the cylinder (4) comprises a cylinder short shaft (42), the cylinder short shaft (42) is provided with a through hole structure (48) for providing a moving space for movement of the oil guiding pipe (7), and the oil guiding pipe (7) is disposed in the through hole structure (48); and an outlet end of the oil guiding pipe (7) is mounted on the rotating shaft (2), the outlet end of the oil guiding pipe (7) is abutted with the rotating shaft hole (21), and an oil guiding sheet (8) is disposed in the oil guiding pipe (7).

6. The rotary cylinder piston compressor pump as claimed in claim 1, wherein a rotating shaft hole oil guiding sheet (22) is disposed in the rotating shaft hole (21).

7. The rotary cylinder piston compressor pump as claimed in claim 1, wherein a piston oil hole (31) penetrating through an inner surface and an outer surface of the piston (3) is provided on a side wall of the piston (3).

8. The rotary cylinder piston compressor pump as claimed in claim 1, wherein an inlet end (211) of the rotating shaft hole (21) is a tapered structure flared outward.

9. The rotary cylinder piston compressor pump as claimed in claim 3, wherein the cylinder (4) comprises a cylinder short shaft (42), and the oil guiding channel is a cylinder hole (43) provided in the cylinder short shaft (42).

10. The rotary cylinder piston compressor pump as claimed in claim 3, wherein the oil guiding channel is an oil guiding pipe (7); the cylinder (4) comprises a cylinder short shaft (42), the cylinder short shaft (42) is provided with a through hole structure (48) for providing a moving space for movement of the oil guiding pipe (7), and the oil guiding pipe (7) is disposed in the through hole structure (48); and an outlet end of the oil guiding pipe (7) is mounted on the rotating shaft (2), the outlet end of the oil guiding pipe (7) is abutted with the rotating shaft hole (21), and an oil guiding sheet (8) is disposed in the oil guiding pipe (7).

11. A compressor, comprising a housing component (71), a motor component (72), the rotary cylinder piston compressor pump as claimed in claim 1, an upper cover component (73) and a lower cover component (74).

* * * * *